(12) United States Patent
Jenkins et al.

(10) Patent No.: US 8,707,194 B1
(45) Date of Patent: Apr. 22, 2014

(54) SYSTEM AND METHOD FOR DECENTRALIZED PERFORMANCE MONITORING OF HOST SYSTEMS

(75) Inventors: Jonathan A. Jenkins, Seattle, WA (US); Benjamin R. Hollis, Seattle, WA (US); Tomi Yiu, Seattle, WA (US); Brian Feinstein, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 384 days.

(21) Appl. No.: 12/623,321

(22) Filed: Nov. 20, 2009

(51) Int. Cl.
*G06F 7/00* (2006.01)

(52) U.S. Cl.
CPC ........................................ *G06F 7/00* (2013.01)
USPC .................................. 715/772; 707/1; 707/10

(58) Field of Classification Search
USPC .................... 707/1; 702/182; 345/473; 703/6; 370/395.52
See application file for complete search history.

(56) References Cited

U.S. PATENT DOCUMENTS

| | | | |
|---|---|---|---|
| 7,051,098 | B2 | 5/2006 | Masters et al. |
| 7,079,010 | B2 | 7/2006 | Champlin |
| 2002/0170004 | A1 | 11/2002 | Parrett et al. |
| 2004/0064293 | A1* | 4/2004 | Hamilton et al. ............. 702/182 |
| 2004/0167759 | A1* | 8/2004 | Kawakami ........................ 703/6 |
| 2004/0223497 | A1* | 11/2004 | Sanderson et al. ....... 370/395.52 |
| 2004/0267691 | A1* | 12/2004 | Vasudeva ......................... 707/1 |
| 2005/0278143 | A1* | 12/2005 | Wegerich et al. ............. 702/182 |
| 2006/0168278 | A1 | 7/2006 | Lazen et al. |
| 2007/0192329 | A1* | 8/2007 | Croft et al. ....................... 707/10 |
| 2007/0262994 | A1* | 11/2007 | Meighan et al. .............. 345/473 |

OTHER PUBLICATIONS

Dan Farino, "Behind the Scenes at MySpace.com," Chief Systems Architect, myspace, Nov. 21, 2008.
Scott Ruthfield, et al., "Spike Night," O'Reilly Velocity, Jun. 23, 2009, San Jose, CA.

* cited by examiner

*Primary Examiner* — Matt Kim
*Assistant Examiner* — Tuan S Nguyen
(74) *Attorney, Agent, or Firm* — Robert C. Kowert; Meyertons, Hood, Kivlin, Kowert & Goetzel, P.C.

(57) ABSTRACT

Various embodiments of a system and method for decentralized performance monitoring of host systems are described. Embodiments may include one or more client systems, each of which may monitor the performance of one or more host systems. In some embodiments, at least some of the host systems may be members of a cloud computing environment. A given client system may collect metrics from multiple different host systems and aggregate such metrics on the client system. In various embodiments, metrics may be collected by the client system directly from the multiple different host systems without utilizing a centralized repository of metrics. In various embodiments, the given client's receipt of the metrics from the multiple different hosts systems may be an initial aggregation of those metrics together on the same computer system. The client system may generate a graphical representation of the metrics collected from multiple hosts systems.

45 Claims, 7 Drawing Sheets

SYSTEM AND METHOD FOR DECENTRALIZED PERFORMANCE MONITORING OF HOST SYSTEMS

BACKGROUND

Cloud computing represents a paradigm shift in the way computing resources are delivered and consumed. In cloud computing, service providers may operate a "cloud" of network-accessible resources, such as network-accessible software applications, services (e.g., web services), storage, and computational resources (e.g., processor cycles). These resources may be offered to cloud consumers under a variety of commercial arrangements. In many cases, such arrangements may prove to be an economically viable solution to the technology needs of consumers. For instance, one example may include a "pay as you go" arrangement where consumers have the option to pay for only the cloud resources they consume. These arrangements may be particularly attractive to consumers that have temporary computing resource needs. For instance, a consumer looking to process a large one-time job (e.g., processing a library of books with optical character recognition) may purchase or lease cloud resources to perform the job without investing in the significant capital expenditures required to purchase physical hardware capable of performing the same job. Various other characteristics make cloud computing an attractive solution to many consumers. For instance, when time is of the essence, cloud computing can provide consumers with the necessary computing resources in an on-demand fashion, which relieves the consumer of longer lead times associated with installation and configuration of physical infrastructure. Generally, the performance of the service provider's cloud may affect the quality of the service received by consumers.

While the system and method for decentralized performance monitoring of host systems is described herein by way of example for several embodiments and illustrative drawings, those skilled in the art will recognize that the system and method for decentralized performance monitoring of host systems is not limited to the embodiments or drawings described. It should be understood, that the drawings and detailed description thereto are not intended to limit the system and method for decentralized performance monitoring of host systems to the particular form disclosed, but on the contrary, the intention is to cover all modifications, equivalents and alternatives falling within the spirit and scope of the system and method for decentralized performance monitoring of host systems as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for decentralized performance monitoring of host systems are described. Embodiments may include interactions between client systems ("clients") and host systems ("hosts"). Generally, the hosts described herein may be components of a cloud computing environment ("cloud"). Note that references to a cloud computing environment are utilized as convenient nomenclature and are intended to be interpreted in a non-limiting manner. Generally, references to a cloud computing environment may include any network-accessible environment that is configured to provide access to one or more network-accessible resources (e.g., providing access to virtualized and non-virtualized computer systems, applications, data storage, processor cycles, services, and other network-accessible resources) to local and/or remote clients. Generally, the entity that owns or controls a cloud may be referred to herein as a service provider. Entities that enlist the services of clouds may be referred to herein as consumers.

As used herein, the terms "host" and "host system" may refer to any system or component of a cloud computing environment. In various embodiments, hosts may be utilized to implement the network-based resources of the cloud. In various embodiments, a host may be a physical computer system configured similar to the computer system of FIG. 7. The host may be configured with an operating system and/or one or more executable applications. In any of the embodiments described herein, a host may be a virtualized computer system or virtual machine implemented on a computer system. In embodiments utilizing virtualization, a single computer system may include multiple hosts, which may be virtual machines managed by a hypervisor or virtual machine monitor on the computer system. In embodiments utilizing virtualization, different hosts on the same computer system may be configured with different operating systems and/or different virtualized hardware profiles. In various embodiments, the host membership of a cloud may change over time as hosts are added or removed by consumers (e.g., by creating or deleting instances of operating systems running on respective virtual machines). Since hosts may be virtualized, such membership changes need not result in changes to the physical configuration of the cloud topology. For instance, as a consumer's need for computing resources changes over time (e.g., a consumer's cloud-hosted website experiences a rise in popularity or the consumer completes a large, one-time processing job on the cloud), the consumer can create or delete hosts. Generally, both virtualized and non-virtualized hosts may be implemented by some underlying hardware (e.g., processor, memory, and/or other components of FIG. 7) and/or software (e.g., processor-executable program instructions, which may implement operating systems, applications, functions, subroutines, etc.) to perform the functionality described herein.

As used herein, the terms "client" and "client system" are not intended to be limited to the configuration of a client utilized in traditional client-server architecture. Generally, a client may include any system that includes a performance monitoring component configured as described in more detail below or any component configured to acquire such a performance monitoring component. In various embodiments, clients may be systems owned and/or controlled by consumers of cloud computing environments. Examples of users that might operate client systems may include administrators and developers that desire metrics for one or more hosts. In one example, a cloud consumer experiencing one or more technical difficulties (e.g., server errors, excessive latency, etc.) with a cloud-hosted website might designate a user with the task of troubleshooting such technical difficulties. The user may utilize a client system to collect, aggregate and/or display metrics of multiple different host systems according to the various techniques described herein. Such client systems may be any type of computer system, such as laptop, desktop or some other type of computer system (e.g., any type of computer system described below with respect to FIG. 7). As described above, a client system may be configured to collect, aggregate and/or display multiple metrics of different host systems among other functionalities as described herein. In various embodiments, such functionalities may be implemented by a performance monitoring component on the client system.

The host systems described herein may be different host systems of the same cloud or host systems of different clouds. In various embodiments, a host system may include a performance reporting component configured to provide various metrics to client systems. Metrics are described in more detail below; some examples of metrics include processor utilization and memory usage. In one example, a client may utilize its respective performance monitoring component to submit requests for metrics to the performance reporting components of multiple host systems. Each performance reporting component may respond to a request by providing the requested metrics to the client. In various embodiments, values of metrics may be historical values, real time values, and/or near real-time values of the requested metrics.

A centralized approach to distributing host metrics might include requiring that host metrics be aggregated in a centralized data store (e.g., a database), which may broker access to the metrics. In one implementation of this approach, all host systems may repeatedly (e.g., periodically or aperiodically) send updated metrics to the centralized data store (utilizing network bandwidth in the process) in order to keep the data store up to date. In contrast to a centralized approach, embodiments may utilize decentralization by forgoing the use of a centralized data store to distribute metrics from host systems to client systems. In various embodiments, multiple host systems may provide metrics to a client system by directly communicating with that client system through one or more data networks (e.g., without the use of a centralized data store acting as a broker of metrics and/or intermediary between the different host systems and the client system). In various embodiments, the performance monitoring component on that client system may be configured to aggregate the metrics of the different host systems together on the client system (e.g., in memory of the client system and/or as part of a graphical display of metrics). In various embodiments, this may be the initial (e.g., first) aggregation of these particular metrics together on the same computer system. This may in various embodiments mean that these particular metrics from different host systems were not previously aggregated in a centralized data store or computer system prior to arrival at the client.

In light of the above, various embodiments may prevent single point(s) of failure, such as the failure of a centralized data store of metrics. Additionally, various embodiments may avoid the latency associated with host systems providing metrics to a centralized data store and the latency associated with client systems retrieving metrics from such centralized data store. In various embodiments, a client may communicate directly with different host systems to obtain metrics. Due to little or no latency in communications between the host system and the client system, metrics may be provided in real-time or near real-time in various embodiments. Various embodiments also provide high throughput of metrics even in cases where multiple clients are receiving metrics at the same time. For instance, in many cases, different clients may receive metrics from distinct sets of hosts (e.g., non-overlapping sets of hosts and/or overlapping sets of hosts). In such embodiments, the transfer of metrics from one set of hosts to a first client and the transfer of metrics from another set of hosts to a second client may occur concurrently and independently. Such techniques can be expanded to any number of clients and respective sets of hosts. Such embodiments may be different than a centralized approach that requires some degree of serialization and associated latency in the delivery of metrics from a centralized data store to different client systems.

Example System Configuration

Figure 1:
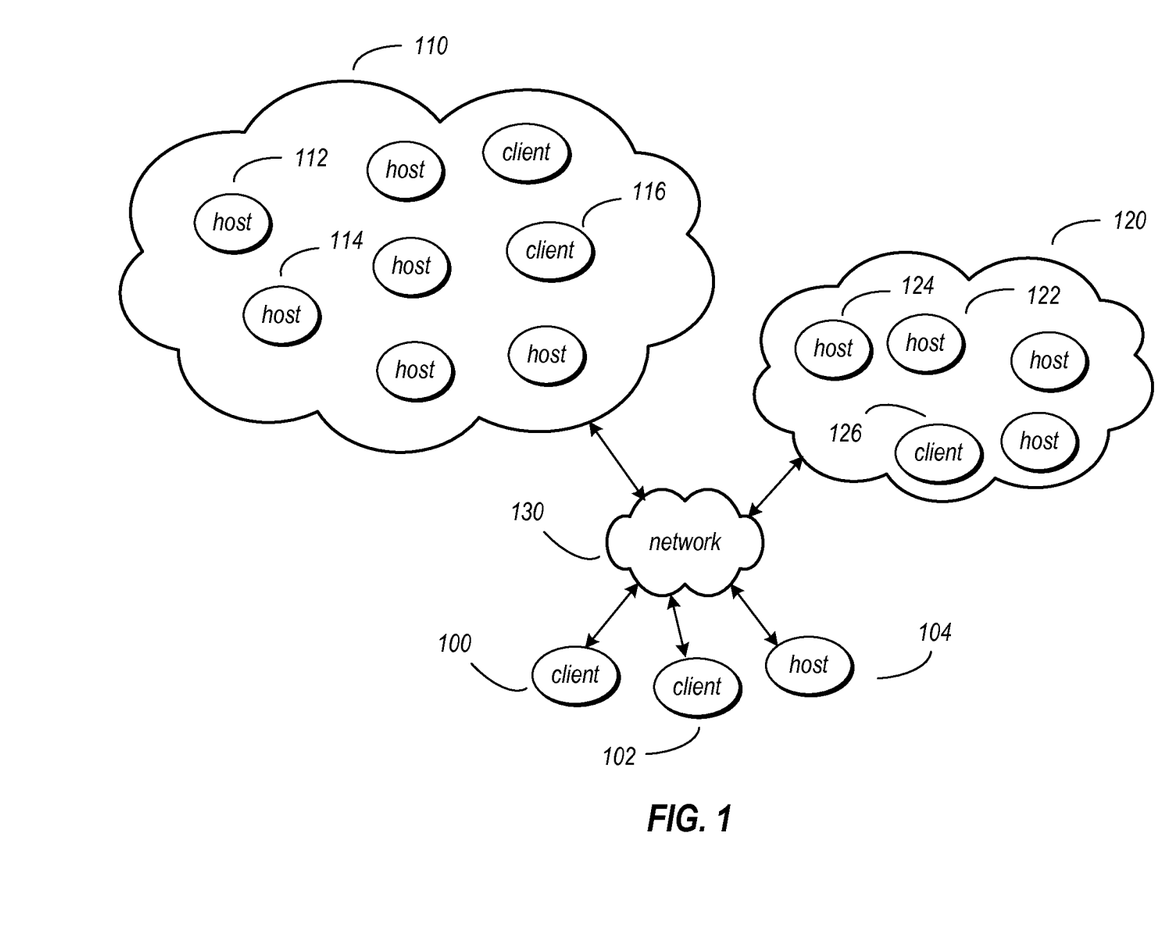
FIG. 1 illustrates a block diagram of client systems and host systems within a multi-cloud environment, according to some embodiments.

FIG. 1 illustrates a block diagram of an example system configuration that includes multiple cloud computing environments as well as client systems configured to monitor metrics of host systems of the cloud computing environments. In the illustrated embodiment, two cloud computing environments are illustrated, cloud 110 and cloud 120; however, in various embodiments, the system may include any number of cloud computing environments. In the illustrated embodiment, cloud 110 may include multiple different hosts, such as hosts 112 and hosts 114, which may be configured as described above. Likewise, cloud 120 may include multiple hosts, such as hosts 122 and 124. In various embodiments, any cloud may also include one or more clients, such as client 116 of cloud 110 and client 126 of cloud 120. The clients of each cloud computing environment may not necessarily participate in providing the network-accessible resources of the cloud (e.g., providing clients access to virtualized and non-virtualized computer systems, applications, data storage, processor cycles, services, and other network-accessible resources). Instead, clients may be members of a cloud by virtue of being located within a boundary of the cloud computing environment. For instance, the hosts and clients of the same cloud may be located behind the same network firewall. In other cases, other network boundaries may be utilized to delineate whether hosts and clients are members of the same cloud. While not illustrated (for purposes of clarity), various hosts and/or clients of the same cloud may be communicatively coupled by one or more computer networks (which may be similar to network 130 described below). In various embodiments, clouds may include other elements or components not illustrated. In various embodiments, the illustrated clouds may include services of a service oriented architecture (SOA) (such as the storage service for storing metrics described below) for performing tasks internal to the cloud and/or to provide cloud resources to external clients.

In various embodiments, different clouds may be coupled to each other and/or one or more external clients through one or more networks, such as network 130. Network 130 may include any network for transmitting data or information between computer systems including but not limited to Local Area Networks (LANs) (e.g., an Ethernet or corporate network), Wide Area Networks (WANs) (e.g., the Internet), wired or wireless data networks, some other electronic data network, or some combination thereof. Examples of external clients (e.g., clients external to the clouds) may include client 100 and client 102. While only two external clients are presented in the illustrated embodiment, other embodiments may include any number of external clients. In some embodiments, some hosts may reside outside of a cloud computing environment, such as host 104. Host 104 may be configured similarly to any of the hosts described above, with the exception that host 104 is not part of a cloud. While the description presented herein largely refers to external clients (e.g., client 100), any of the techniques described herein may also be applied to clients internal to a cloud (e.g., client 116). While the description presented herein largely refers to host systems that are members of a cloud (e.g., host 112), any of the techniques described herein may also be applied to hosts that are not members of a cloud (e.g., host 104).

Decentralized Collection of Metrics

In various embodiments, a client system (e.g., client 100) may be configured to receive metrics from multiple different hosts systems that may or may not be members of the same cloud. The description presented herein largely refers to client 100, although the techniques described herein may be applied in a similar manner to other clients. In various embodiments, client 100 may collect metrics from a set of multiple host systems. This description may refer to an example set of host systems that includes hosts 112 and 114 of cloud 100 and host 122 of cloud 120. Note that in various embodiments different sets of hosts may be utilized.

Figure 2:
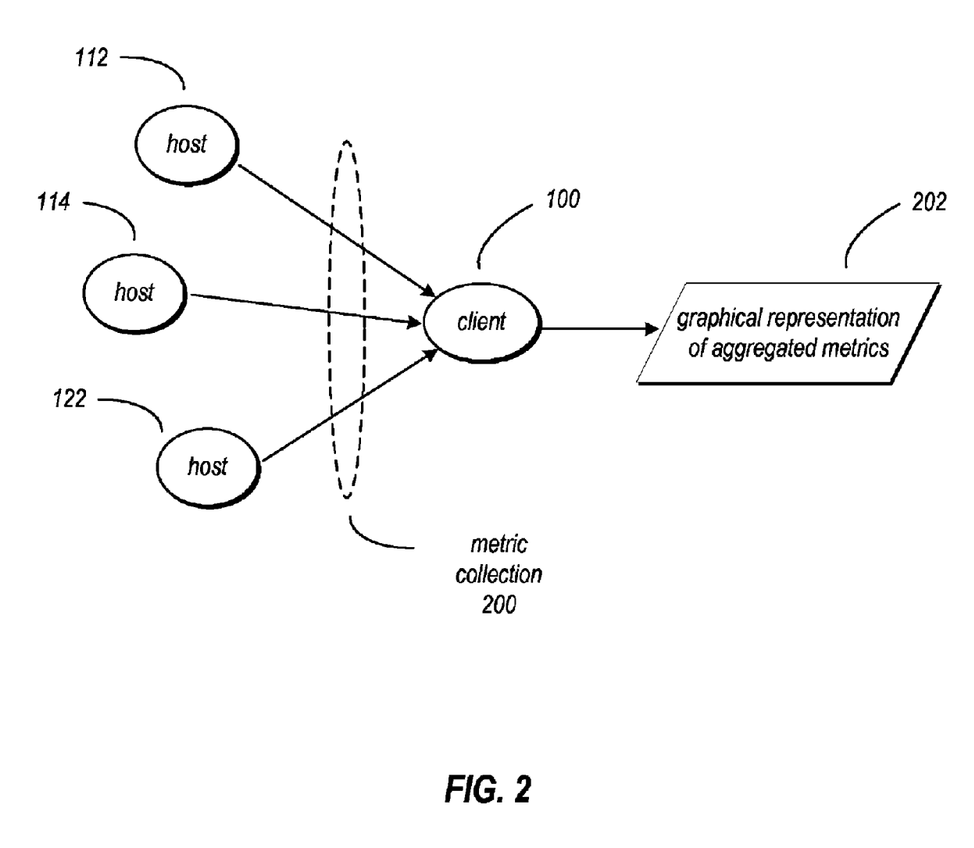
FIG. 2 illustrates a flow diagram representing a client collecting metrics from multiple hosts, according to some embodiments.

FIG. 2 illustrates a flow diagram of the decentralized collection of host metrics illustrated as metric collection process 200, according to various embodiments. In various embodiments, such collection may be decentralized because the metrics may be communicated directly from the different hosts to the client (through one or more networks, such as network 130) thereby avoiding any intermediate aggregation of such metrics together in a data store or computer system other than client 100. Client 100 may be configured to generate a variety of different graphical representations of the aggregated metrics, as illustrated by data 202, which represents a graphical representation of aggregated metrics (e.g., data that may be rendered on a display of client 100). In some embodiments, the communications of metric collection process 200 may take place over a network (e.g., the Internet) via hypertext transfer protocol (HTTP) or other protocols. In various embodiments, each host may provide a network-based interface (e.g., a web server, service interface, or some other network-based interface) for communicating with clients and providing the metrics described herein. In various embodiments, metric information may be accessible via a particular network address (e.g., a uniform resource locator or URL), with or without security protection depending on the sensitivity of the metrics. In various embodiments, communications between hosts and clients may be protected with one or more security mechanisms, such as the Secure Sockets Layer (SSL) communication protocol.

Figure 3:
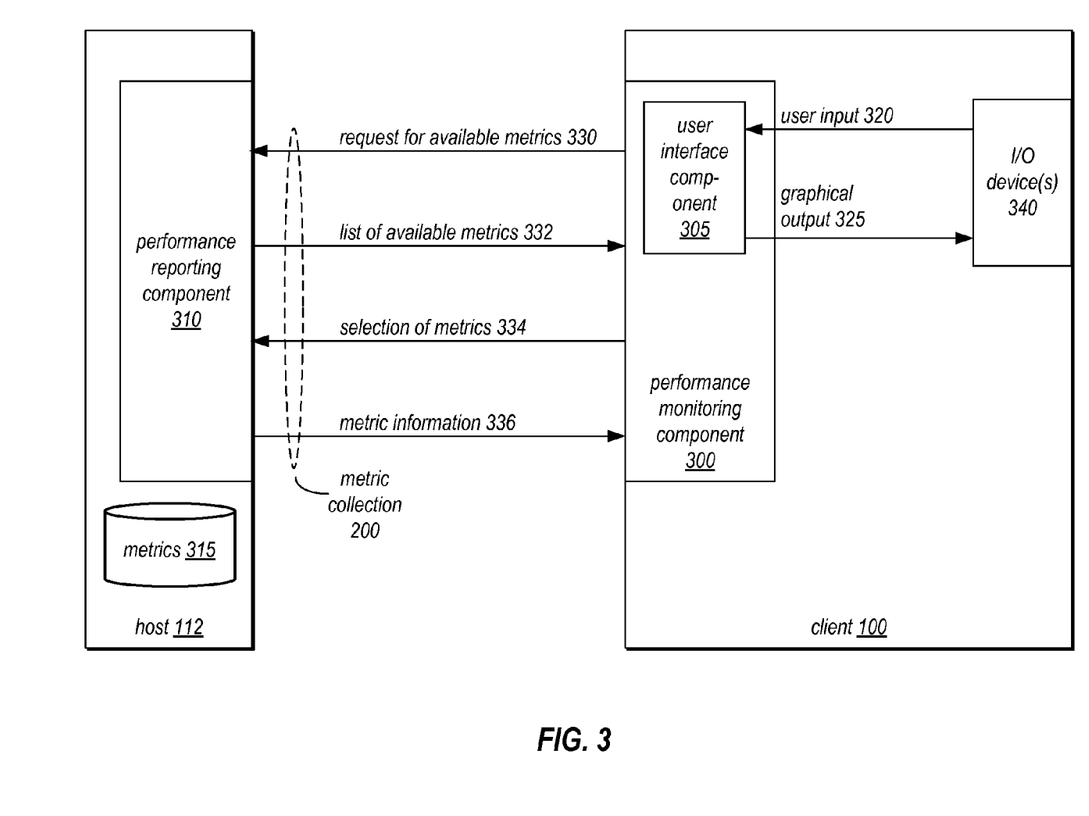
FIG. 3 illustrates a flow diagram representing the communication between a given client and given host system, according to some embodiments.

FIG. 3 illustrates a flow diagram of the communications between client 100 and host 112 during metric collection process 200. Note that for clarity of illustration only the communications between client 100 and host 112 are illustrated. It should be understood that client 100 may be configured to perform a similar process with hosts 114 and 122 in order to receive metrics. Likewise, hosts 114 and 122 may be configured in a manner similar to that of host 112 (e.g., each may include respective performance reporting components and metrics, configured as described below). In general, any host of FIG. 1 may be configured similarly to host 112. Likewise, any client of FIG. 1 may be configured similarly to client 100. In various embodiments, client 100 may communicate with all of hosts 112, 114 and 122 concurrently or at different times, according to various embodiments.

As illustrated in FIG. 3, host 112 may include a performance reporting component 310. Performance reporting component 310 may be configured to measure or determine multiple different metrics pertaining to host 112. Generally, metrics of a given host may include but are not limited to information pertaining to the performance of the host as well as the performance of any components or peripherals of the hosts; such metrics may include but are not limited to performance metrics, error information, latency information and other information as described in more detail herein. Metrics may include metrics of one or more processors of host 112 including but not limited to current processor utilization percentage, processor load average over a specified time period (e.g., last 5 minutes), quantity of currently-running process, and total quantity of running and waiting processes. Note that the metrics of a given host may be aggregated locally on that host, as described in more detail below with respect to metric data store 315. In various embodiments, the metrics may include metrics of a memory of host 112 including but not limited to percentage of total memory used, percentage of swap used, page faults per specified time period (e.g., per second), quantity of memory page-ins or page-outs per specified time period (e.g., per second), and/or quantity of swap-ins and swap-outs per second. The metrics may include network-related metrics of the host including but not limited to quantity of data transmitted or received over a specified time period (e.g., kilobytes per second), quantity of transmitted or received packets, and/or quantity of received packet errors or packet drops over a specified time period (e.g., drops per second). Metrics may also include input-output metrics, such as metrics of any input-output device described below (e.g., any I/O device of FIG. 7). In various embodiments, input-output metrics may include a measure of the quantity of reads and/or writes per second (or some other time period). Other metrics may include disk metrics, such as metrics of any disk-based storage device of a host system.

In embodiments where host 112 is configured with a web server application for hosting one or more websites, the metrics may include but are not limited to quantity of incoming traffic requests (e.g., requests per second), completed traffic (e.g., completed requests per second), execution time (e.g., summed per second), and/or requests per second categorized by status code.

In embodiments where host 112 is configured with network-based service interfaces (e.g., to provide web services), the metrics may include but are not limited to quantities of incoming requests, completed requests, faults, failures, and throttled requests. Such metrics may in various embodiments be measured over a specified time period (e.g., on a count per second basis). Such metrics may also include but are not limited to execution time (e.g., total, activity, and/or transmuter). Such metrics may also include but are not limited to the status of service resources including but not limited to threads in use (e.g., percentage of reserved), file descriptors in use (e.g., percentage of reserved), heap memory in use (e.g., percentage of reserved), non-heap memory in use (e.g., percentage of reserved), garbage collection time, and garbage collection object count.

In embodiments where host 112 is configured to implement one or more virtual machines, the metrics may include but are not limited to heap usage (e.g., absolute and percentage of total), non-heap usage (absolute and percentage of total, number of threads, quantity of garbage collection objects collected, and time spent performing garbage collection.

In various embodiments, host 112 may be configured with one or more executable applications (e.g., an application stored in memory of host 112 and executable by one or more processors of host 112). In such embodiments, the metrics may include metrics about such applications. For example, in various embodiments, host 112 may be configured to execute a messaging application for both sending messages to and receiving messages from other hosts, services, or computer systems. In such an embodiment, the metrics described herein may include but are not limited to quantity of messages received and/or quantity of messages sent by the message application. Other metrics may be tailored to specific applications executing on host 112, according to various embodiments.

In various embodiments, performance reporting component 310 may be configured to collect any of the above described metrics on a periodic, aperiodic, and/or continuous basis. In various embodiments, the metrics may be stored in a local data store of host 112, as illustrated by metrics data store 315. In various embodiments, data store 315 may be configured as a database, as one or more mass storage devices (e.g., physical disks, logical volumes, etc.) configured to store data blocks or files, or in any other suitable configuration for data storage. For each metric, performance reporting component 310 may be configured to capture a value of that metric at different instances in time. In various embodiments, the granularity at which the performance reporting component captures these values may be configurable on a per metric basis. For example, performance reporting component 310 may capture a processor utilization metric every second and a memory utilization metric every 5 seconds. Such granularities are merely examples; other time granularities may be utilized in various embodiments. In various embodiments, any of the metrics described herein may be stored in metric data stores 315 and continually updated by performance reporting component 310.

In various embodiments, the performance reporting component 310 may be configured to discard metrics that are older than a specified time period (e.g., metrics older than one year, or some other configurable time period). In some embodiments, this discarding may be performed in order to conserve memory on the host. In some embodiments, the performance reporting component may be configured to offload some or all of metrics 315 to a storage service provided by cloud 110 or some other cloud. In some cases, the storage service may be utilized to store metrics for long term retention (e.g., one year or longer).

Client system 100 may include performance monitoring component 300 for collecting metrics and generating graphical representations of aggregated metrics, among other functionalities. In various embodiments, performance monitoring component 300 may be an executable application that is pre-installed on the client system. In other embodiments, performance monitoring component 300 may be an executable application that is dynamically obtained at monitoring time. For instance, in various embodiments, client 100 may include a web browser (or other browser configured to view network-based content) in which the monitoring component is dynamically loaded at monitor time. In such embodiments, the performance monitoring component may be a lightweight application specified according to one or more web standards, such as standard scripting languages including but not limited to JavaScript and/or Asynchronous JavaScript and XML (AJAX). Other standards that may be utilized include the Web Workers application programming interface (API) and the canvas element of Hypertext Markup Language (HTML) 5. In another example, performance monitoring component 300 may be a plug-in (e.g., web browser plug-in) or application extension. In other embodiments, performance monitoring component 300 may be implemented with network-based standards other than those specified above, whether such standards are presently known or developed in the future.

Performance monitoring component 300 may also include a user-interface component 305 configured to interface with one or more input/output devices 340, which may be configured in a manner similar to that described below with respect to input/output devices 950 of FIG. 7. Input/output (I/O) device(s) 340 may be configured to receive data from external input components (e.g., keyboard, mouse, trackball, touchscreen, etc.) and provide data to external output components (e.g., electronic display, touchscreen, etc.). In the illustrated embodiment, I/O devices 340 may receive user input 320 and provide such input to user interface component 305. In various embodiments, user input 320 may specify one or more metrics that are to be collected. User input 320 may also specify the selection of various user-interface controls for controlling aspects of performance monitoring component 300; such controls are described in more detail below with respect to FIG. 4.

As illustrated, performance monitoring component 300 and performance reporting component 310 may be configured to perform metric collection process 200. In various embodiments, the illustrated communications between host 112 and client 100 may take place over one or more networks, such as network 130 described above. In various embodiments, performance monitoring component 300 may be configured to submit a request for available metrics (330). Such request may be a request for a listing of metrics that are collected by the performance reporting component. Performance reporting component 310 may evaluate the request and provide a response to the performance monitoring component (332). This response may specify a listing of metrics that the performance reporting component 310 is available to provide to the performance monitoring component. In various embodiments, some or all of this listing may be provided as part of graphical output 325. For instance, user-interface component 305 might generate a graphical listing of selectable metrics such that a user may select metrics of interest to be monitored. In various embodiments, some or all of the metrics may be selected and an indication of such may be provided to the performance monitoring component 300 as part of user input 320. Performance monitoring component 300 may be configured to provide a selection of metrics from listing 332 to performance reporting component 310, as illustrated by selection of metrics 334. In various embodiments, this selection of metrics may specify some or all of the metrics from the list of available metrics. Such selection may in various embodiments be based upon user input. For instance, selection of metrics 334 may specify a set of metrics that is the same as a set of metrics specified by user input 320. Performance reporting component 310 may be configured to evaluate selection 334 and provide metric information 336 in response to selection 334.

Metric information 336 may include, for each of the selected metrics specified by selection of metrics 334, one or more values of that metric at respective instances in time. For instance, if percentage of processor utilization and percentage of memory utilization were selected at 334, metric information may include multiple values for each of those percentages at different instances in time. In one example, metric information may specify metrics at a one second level granularity, which may mean that metric information 336 may specify percentage values for processor utilization and memory utilization for each second of a specified time period (e.g., the last five minutes). In various embodiments, this time period may also be specified at 334 along with the selection of metrics. In various embodiments, performance reporting component 310 may generate metric information 336 from metrics of metrics data store 315. In other embodiments, metric information 336 may be streamed in real time to reflect the most recent metrics captured or measured by the reporting component. In one example, such streaming may be performed by the client and host establishing an active connection (e.g., a dedicated socket connection) through which data (e.g., metrics) may be passed. In another example, the client may periodically or aperiodically poll one or more hosts for metrics (e.g., through HTTP requests). In some embodiments, metric information may be some combination of historical and real-time values.

The manner in which performance reporting component 310 provides metric information to performance monitoring component 300 may be specified by information provided by performance monitoring component 300. For instance, user input 320 may specify various configuration settings for the performance reporting component, which may be provided to the performance reporting component by performance monitoring component 300. In one example, such configuration settings may specify the time granularity of metric values (e.g., every second, every minute, every five minutes, etc.). In another example, such configuration settings may specify the time period for which metric values should be provided. Such time period could be a rolling window of the last 10 minutes or some other time period. Such time period could also be a specified time period in the past (e.g., a specific one hour period some time in the past). Such a time period may be useful for troubleshooting host errors known to occur during a specific time period in the past. In various embodiments, the above-mentioned configuration settings for the performance reporting component may also include settings for metric collection. For instance, settings for metric collection may specify that a given metric is to be collected on an ongoing basis and/or according to a schedule. In some cases, such metrics may be historical metrics that are stored locally on the host (e.g., in data store 315). In another example, settings for metric collection may specify that a given metric is to be collected only upon request from a client; in some cases, such a configuration may be utilized to conserve resources on the host. In various embodiments, configuration settings for the collection of metrics may apply uniformly to all metrics on a host. In other cases, configuration settings for the collection of metrics may be applied on a per-metric basis (e.g., different configuration settings may apply to different metrics).

As described above, similar metric information 336 may be received from multiple additional hosts, such as hosts 114 and 122. This metric information may be aggregated together on client 100 (e.g., in memory of client 100). Performance monitoring component 300 may be configured to provide one or more graphical representations of the aggregated metric information received from the different hosts as well as a user interface for controlling how such representations are displayed. In various embodiments, user interface controls and graphical representations may be a part of graphical output 325, which may be displayed on an external display (e.g., display 980, described below).

Figure 4:
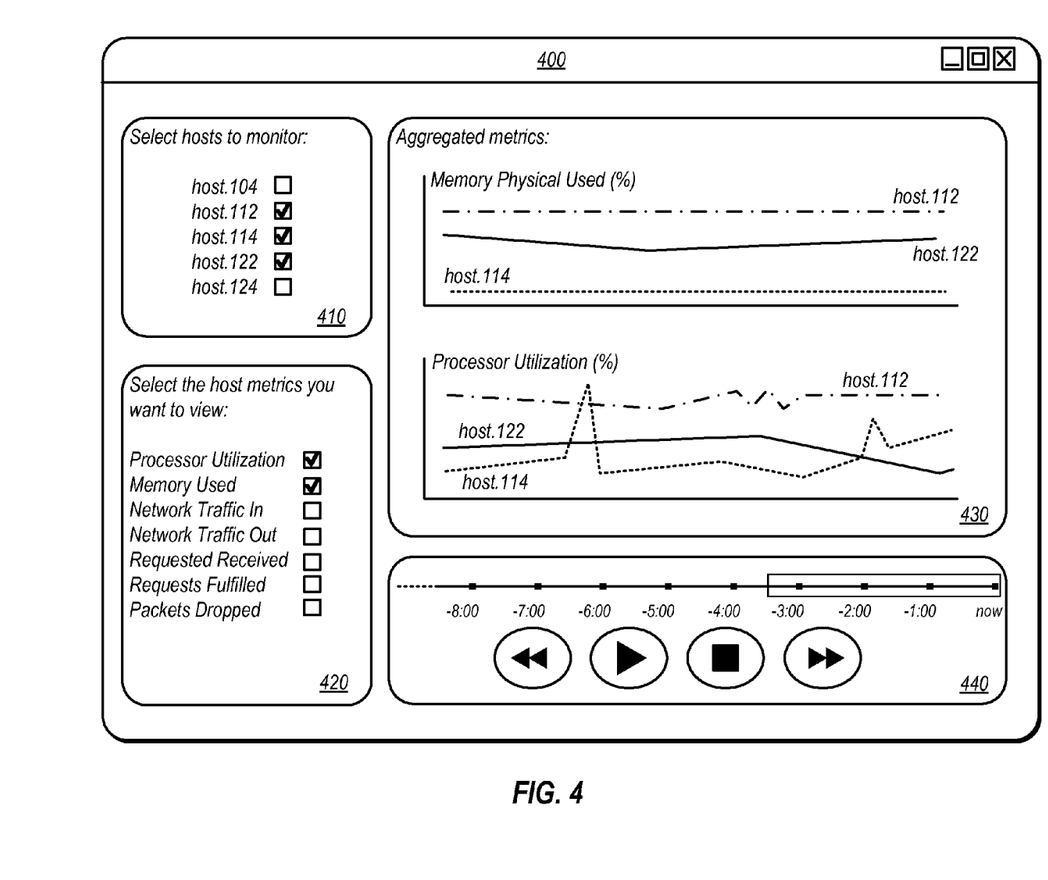
FIG. 4 illustrates an example user-interface display including multiple user interface controls and a graphical representation of aggregated metrics generated based on such controls, according to some embodiments.

In some embodiments, performance monitoring component 300 may be configured to determine an aggregated metric from individual metrics of different host systems. For example, the performance monitoring component may be configured to generate a value for average processor utilization of a group of hosts by averaging individual values of processor utilization associated with respective hosts of that group. In various embodiments, aggregated metrics may be determined based on any of the various types of metrics described herein. In various embodiments, these types of metrics may be displayed as part of the graphical representation generated by performance monitoring component 300 (e.g., graphical representation 430 described below).

FIG. 4 illustrates an example display 400 including aggregated metric information for multiple hosts as well as controls for controlling the way such aggregated performance information is displayed to the user. In various embodiments, display 400 and its contents may be defined by graphical output 325 described above. In various embodiments, any of the controls of display 400 may be selected by a user; such selection may be specified by user input 320. Generally, display 400 is one example of a user interface between a user and the performance monitoring component of client system 100; other example user interfaces are possible and contemplated.

In various embodiments, display 400 may include a host selection control 410, which may include distinct controls for selection of one or more host systems of various cloud computing environments. In some cases, hosts outside of cloud computing environments (e.g., host 104) may also be selected. In the illustrated embodiment, host 112, host 114 and host 122 are selected for monitoring. The performance monitoring component may be configured to detect the hosts selected and generate requests for available metrics that are sent to the respective hosts (similar to request 330 described above). In response to such request, the host performance monitor may be configured to receive a list of available metrics from each of the hosts (e.g., list 332 described above). These available metrics may be aggregated into a selectable list of metrics, one example of which is illustrated as performance selection control 420. In the illustrated embodiment, a processor utilization metric and a memory utilized metric are selected. The performance monitoring component described herein may be configured to detect such selection (e.g., such selection may be specified by user input 320) and request the metrics from each of the selected hosts. One example of such a request is described above with respect to selection of metrics 334. In response to such requests, the performance monitoring component may, for each selected host, receive values of the selected metrics from the respective performance reporting component of that host. Such values may be utilized by the performance monitoring component on the client to generate a graphical representation of the aggregated values of the metrics for each host, as illustrated by graphical representation 430. In various embodiments, the graphical representation of metrics (e.g., graphical representation 430) may display a default listing of metrics without a user indication of which metrics to plot. In some cases, default metrics may be stored in a user preferences file managed by the performance monitoring component. In the illustrated example, the graphical representation includes plots of the metric values over a specified time period. In various embodiments, user interface controls 440 may be utilized to specify such time period. For instance, in the illustrated embodiment, user interface controls 440 include a sliding window of time (denoted by the rectangle superimposed on the illustrated timeline) that may be adjusted for position and length. The performance reporting component may be configured to plot values corresponding to the time specified by this sliding window. In various embodiments, user interface controls 440 may include playback controls for controlling a moving animation of the aggregated metric plots of graphical representation 430. For instance, in response to the selection of a play control, the performance monitoring component may cause graphical representation 430 to scroll the aggregated plots of metrics over a specified time period. For instance, the graphical representation could display an animation of a rolling one-minute window of the past 10 minutes of aggregated metrics. Appropriate controls for stopping, pausing, fast-forwarding and rewinding (and other media-related functions) may also be provided.

Example Method(s)

Figure 5:
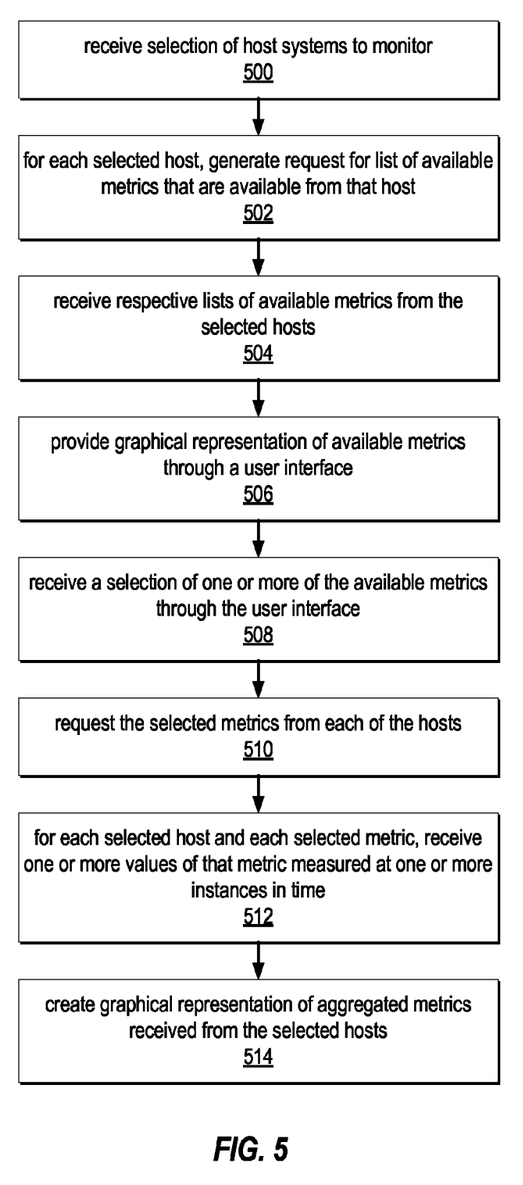
FIG. 5 illustrates a flowchart of an example method for collecting metrics from multiple hosts and generating a graphical representation of aggregated metrics, according to some embodiments.
Figure 6:
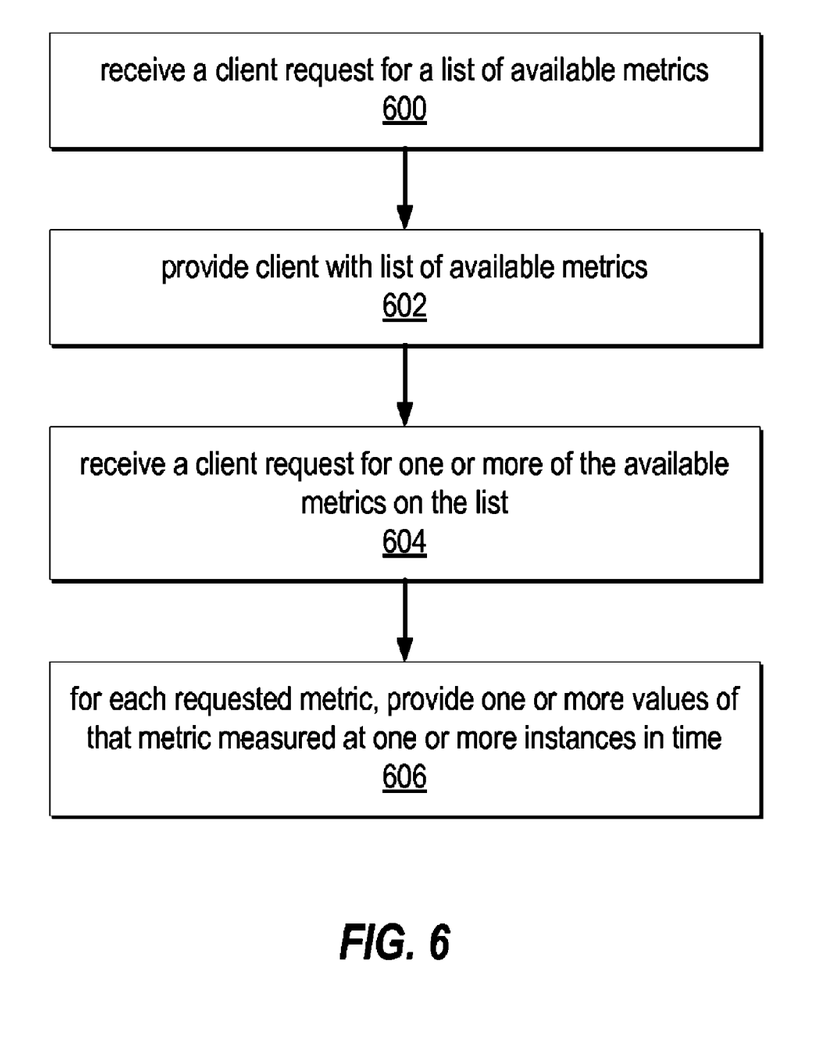
FIG. 6 illustrates a flowchart of an example method for providing requested metrics, according to some embodiments.

Various methods may be performed according to the system and method for decentralized performance monitoring of host systems. FIGS. 5-6 illustrate flowcharts of examples of such methods. In various embodiments, the methods of FIGS. 5-6 may be performed by the performance monitoring and performance reporting components described herein.

FIG. 5 illustrates a flowchart of an example computer-implemented method for acquiring metrics from multiple different hosts and generating a graphical representation of an aggregation of such metrics. In various embodiments, the illustrated method may be performed by a client system, such as client system 100 above. In various embodiments, the method may be performed by the performance monitoring component described herein. As illustrated by block 500, the method may include receiving a selection of host systems to monitor. In various embodiments, this selection may be received as user input. One example of such a selection includes receiving a selection through a user interface control, such as user interface control 410 described above. As illustrated by block 502, the method may also include, for each selected host, generating a request for a list of available metrics from the selected hosts. As used herein, a list or listing of available metrics may include any information that indicates or specifies one or more available metrics. One example of such a request is described above with respect to request 330. As illustrated by block 504, the method may also include receiving respective lists of available metrics from the selected hosts (e.g., list 332 described above). In various embodiments, each list may specify the metrics that the respective host collects. In various embodiments, the hosts may not necessarily collect the same host metrics (e.g., different hosts may have different metric collection capabilities or configurations).

As illustrated by block 506, the method may also include providing a graphical representation of the available metrics through a user interface. One example of such a user interface is user interface display 400 described above. In various embodiments, this graphical representation may include a selectable list, such as control 420 described above. As illustrated by block 508, the method may include receiving a selection of one or more of the available metrics through the user interface. In various embodiments, this may be a selection performed by a user via one or more input devices. As illustrated by block 510, the method may include requesting the selected metrics from each of the hosts. One example of such a request is described above with respect to request 334 described above. As illustrated by block 512, the method may also include, for each selected host and each selected metric, receiving one or more values of that metric measured at one or more instances in time. One example of this information is described above with respect to metric information (e.g., metric information 336). As illustrated by block 514, the method may also include creating a graphical representation of aggregated metrics received from the selected hosts (e.g., graphical representation 430 described above).

FIG. 6 illustrates a flowchart of an example computer-implemented method for providing metrics from a given host. In various embodiments, the illustrated method may be performed by a host system, such as host system 112 above. In various embodiments, the method may be performed by the performance reporting component described herein. As illustrated by block 600, the method may include receiving a client request for a list of available metrics. In various embodiments, this may be a request for all of the metrics that a host is configured to collect. One example of such a client request is illustrated as request 330 described above. As illustrated by block 602, the method may include providing the client with a list of available metrics. One example of such a list is described above with respect to list of available metrics 332. As illustrated by block 604, the method may include receiving a client request for one or more of the available metrics on the list. For instance, the client may receive a user selection of metrics from the list and provide that selection as a request for particular metrics. Various embodiments may include receiving such a request. As illustrated by block 606, the method may also include, for each requested metric, providing one or more values of that metric measured at one or more instances in time. For instance, in various embodiments, this may include providing historical metrics, such as metrics cached locally in a data store (e.g., metric data store 315) and/or providing metrics in real time (or near real time) as they are measured.

Additional Embodiments

In various embodiments, the performance monitoring component described herein may be configured to save and/or capture different graphical representations of aggregated metrics. For instance, as described above with respect to FIG. 4, the performance monitoring component may be configured to create an animation of aggregated metrics that scrolls across different time periods. In such embodiments, the user interface may include a control (not illustrated) for capturing an instance of that animation (e.g., an image of the animation at a particular instance in time). In various embodiments, controls for modifying the manner in which plots are display may also be provided (e.g., zoom options, axis configuration, selection of plot type, variable selection for each axis, etc.).

Various embodiments may provide mechanisms for cost attribution that enable the collection of metrics (and any associated costs) to be attributed to respective entities (e.g., individuals or organizations). In various embodiments, each host of a cloud computing environment may be associated with a particular entity, such as an entity that created an instance of the host on the cloud computing environment. In some embodiments, costs associated with metric acquisition may fall under the scope of the costs associated with creating or owning the instance of the host in the cloud computing environment. In other embodiments, entities may be charged per processing cycle or for quantity of data transfer, in which case the costs associate with metric acquisition may be attributed to the processing cycles and/or quantity of required to complete the metric acquisition. In some cases, metrics may be acquired via client and/or host messages. In such cases, costs may be attributed on a per message basis.

In various embodiments, the graphical representations of aggregated metrics may be correlated with one or more events. For instance, in one embodiment, the host performance monitor described above may be configured to plot events on graphical representation 430. In one embodiment, the host performance monitor might create a vertical line at a particular instance in time as well as a graphical indication as to which event the line corresponds to. One example of such an event might be a software deployment. In this way, events and metrics may be aggregated together and visually correlated to provide the user with a sense of how events affect the performance of various hosts.

One type of system monitor includes the "top" command, which is available in most Unix-like operating system. The top command and similar commands may be referred to herein as a system monitor command. System monitor commands may provide a variety of host information, such as a list of currently running host processes and associated resources (e.g., processor usage, memory utilization, etc.). In various embodiments, the performance monitoring component described herein may be configured to perform a remote system monitor command on multiple hosts, which may span multiple cloud computing environments. Each host may respond to the system monitor command with information about the host, such as a list of currently running host processes and associated resources (e.g., processor usage, memory utilization, etc.) and possibly other information (e.g., network utilization, or other machine statistics). In various embodiments, the performance monitoring component described herein may be configured to aggregate the results of the multiple system monitor commands and provide such results in graphical form. For instance, in one example, the performance monitoring component described herein may be configured to generate a listing of all processes across different hosts, where each process is ranked by processor utilization. Other implementations are possible and contemplated.

In manner similar to the aggregated system monitor command described above, the performance monitoring component described herein may be configured to request log information from multiple hosts and aggregate the logs together on the client system. In various embodiments, the performance monitoring component may be configured to generate a graphical and/or textual representation of an aggregated log file that includes aggregated log entries and/or error listings of multiple hosts.

In various embodiments, the performance monitoring component described herein may be configured to provide a shell access control for submitting commands to hosts (e.g., after proper client authentication). For instance, the display of FIG. 4 may include a selectable control (not illustrated) for each host that, when selected, results in the display of a dialog box to submit shell commands directly to the host. In various embodiments, the performance monitoring component may be configured to aggregate heap dumps and stacks of the host systems together on the client system. In various embodiments, graphical representations of each may be provided by the performance monitoring component.

In various embodiments, in addition to aggregated metrics, the host performance monitoring component may be configured to collect and aggregate any arbitrary data, such as stock prices or sensor reading from a chemical plant or refinery. In various embodiments, the host performance monitoring component may be configured to collect and aggregate any information that host systems are capable of providing. In various embodiments, this may be performed in the decentralized manner described above (e.g., without a centralized data store that acts as an information broker).

In various embodiments, the network addresses of the various hosts may be user-specified (e.g., via user input 320). In other cases, the performance monitoring component described herein may be configured to retrieve host addresses elsewhere (e.g., another host, computer system, or data base). In some cases, there may be an initial configuration of host address when the performance monitoring component is loaded on the client system.

Various embodiments presented herein are described from the perspective of client system 100 performing metric collection, aggregation and display. Note that the description is structured in this manner for purposes of clarity. Generally, multiple different clients may perform any of the functionality described herein (e.g., metric collection, aggregation and display) either concurrently or at different times. Further, in various embodiments, different clients may monitor different sets of host systems, which may or may not be overlapping sets of host systems.

Example Computer System

Various embodiments of a system and method for decentralized performance monitoring of host systems, as described herein, may be executed on one or more computer systems, which may interact with various other devices. Note that any component, action, or functionality described above with respect to FIGS. 1-6 may be implemented via one or more computer systems configured as computer system 900 of FIG. 7, according to various embodiments. For instance, in various embodiments, computer system 900 may implement a host (or multiple hosts through the use of a hypervisor) or a client. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 implementing performance monitoring component 300 and user interface component 305 (configured as described above) and aggregated metrics 934, which may include metric information from multiple different hosts, are shown stored within system memory 920. Additionally, data 932 of memory 920 may store any of the data structures described above, in some embodiments. In various embodiments, program instructions and/or data may be received, sent or stored upon different types of computer-accessible media or on similar media separate from system memory 920 or computer system 900. While computer system 900 is illustrated as implementing the functionality of performance monitoring component 300, any of the components illustrated above with respect to previous Figures, (e.g., performance reporting component 310, etc.) may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices (e.g., any other component described above) attached to a network 985 (which may be similar to or the same as network 130 described above) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Figure 7:
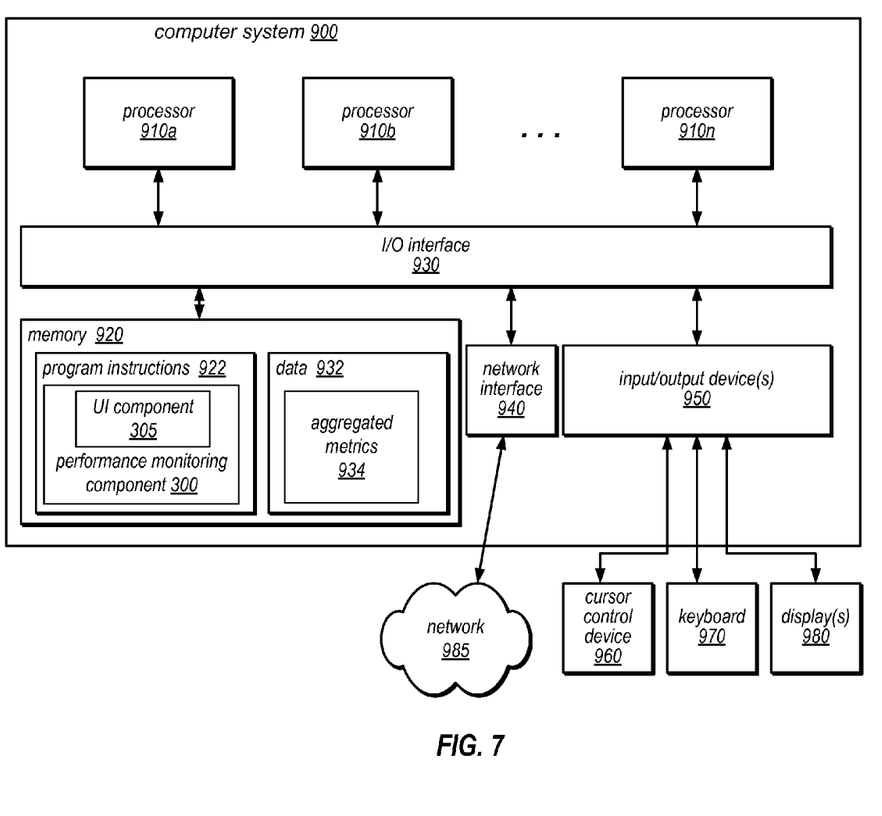
FIG. 7 illustrates one example of a computer system suitable for implementing various elements of the system and method for decentralized performance monitoring of host systems, according to some embodiments.

As shown in FIG. 7, memory 920 may include program instructions 922 configured to implement any element or action described above, such as the functionality of performance monitoring component 300. In one embodiment, the program instructions may implement the methods described above, such as the method illustrated by FIGS. 5-6. In other embodiments, different elements and data may be included. Note that data 932 may include any data described above with respect to FIGS. 1-6.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-accessible storage medium or computer-accessible memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer system, comprising:
a client device, comprising:
a network interface;
a memory; and
one or more processors communicatively coupled to the memory, wherein the memory comprises program instructions executable by the one or more processors to implement a performance monitoring component configured to:
for multiple individual host systems: receive metric information in a decentralized manner, wherein the metric information is received at the network interface of the client device from a respective network-based interface of that host system; wherein for one or more metrics, the metric information indicates multiple values of that metric at different instances in time; wherein the one or more metrics are associated with performance of that host system; and
generate a user interface display comprising a graphical representation of the metric information from the plurality of host systems;
wherein receipt of the metric information from the multiple host systems is an initial aggregation of the metric information from the multiple host systems together on the client device, wherein the initial aggregation foregoes the use of a centralized data store to aggregate the metric information from the multiple host systems prior to transmittal to the client device.

2. The computer system of claim 1, wherein the performance monitoring component is configured to, prior to receiving the metric information from the plurality of host systems:
for the multiple individual host systems, receive an indication of metrics that are available from that host system;
provide a user interface display comprising a selectable representation of at least some of the available metrics;
receive a selection of one or more of the available metrics through the user interface display; and
for the multiple individual host systems, generate a request for one or more metrics in accordance with said selection; wherein said metric information is received in response to generating said request.

3. The computer system of claim 1, wherein the performance monitoring component is configured to generate said graphical representation of the metric information such that the graphical representation comprises, for each of at least some of the host systems: a plot of at least one metric, wherein said plot comprises a graphical representation of the values of the at least one metric at different instances in time.

4. The computer system of claim 3, wherein the performance monitoring component is configured to:
provide a graphical control for selecting a particular period of time, wherein the values upon which each plot is dependent comprise values measured during that particular period of time.

5. The computer system of claim 4, wherein the graphical control comprises a movable window of time superimposed on a timeline, wherein the graphical control is provided such that a length and a position of the window are configurable in order to specify said particular period of time.

6. The computer system of claim 3, wherein one or more of the plots are animated and change over time.

7. The computer system of claim 6, wherein the performance monitoring component is configured to provide one or more controls configured to control movement of the animated plots.

8. The computer system of claim 1, wherein at least some of the host systems are members of a cloud computing environment.

9. The computer system of claim 8, wherein at least some host systems are members of different cloud computing environments.

10. The computer system of claim 1, wherein the one or more metrics include one or more of: processor metrics, memory metrics, network metrics, input-output metrics, disk metrics, or application metrics.

11. The computer system of claim 1, wherein the performance monitoring component is configured to generate an aggregated metric based on individual metrics of multiple host systems of said plurality of host systems, wherein said graphical representation comprises a representation of said aggregated metric.

12. A host computer, comprising:
a memory; and
one or more processors communicatively coupled to the memory, wherein the memory comprises program instructions executable by the one or more processors to implement a performance reporting component on the host computer, the performance reporting component configured to:
receive from a client device a request for information specifying available metrics;
in response to the request for information specifying available metrics, provide to the client device a particular indication of available metrics of the host computer, wherein the metrics are measured on the host computer;
subsequent to providing the particular indication, receive a request from the client device for one or more metrics from the particular indication; and
for the metrics specified in the request, provide metric information, wherein the metric information is provided from a network interface of the host computer to a network interface of the same client device that sent the request for information specifying available metrics without intermediate storage of the metric information in a data store of metric data distinct from the host computer such that providing the metric information to the client device forgoes the use of a centralized data store distinct from the host computer to aggregate the metric information, the metric information specifying one or more values of that metric measured on the host computer at one or more instances in time.

13. The host computer of claim 12, wherein the performance reporting component is configured to provide one or more historical values of metrics, wherein said historical values are stored within the memory prior to receiving the request for information specifying available metrics.

14. The host computer of claim 12, wherein the performance reporting component is configured to provide one or more real time values of metrics, wherein said real time values are not stored within the memory prior to receiving the request for information specifying available metrics.

15. The host computer of claim 12, wherein the available metrics include one or more of: processor metrics, memory metrics, network metrics, input-output metrics, disk metrics, or application metrics.

16. A computer-implemented method, comprising:
for multiple individual host systems: receiving metric information in a decentralized manner from a respective network-based interface of that host system; wherein for one or more metrics, the metric information indicates multiple values of that metric at different instances in time; wherein the one or more metrics are associated with performance of that host system; and
generating a user interface display on a client device comprising a graphical representation of the metric information from the plurality of host systems, wherein the metric information that is received from the network-based interface of that host system is received at a network-based interface of the client device;
wherein receipt of the metric information from the multiple host systems is an initial aggregation of the metric information from the multiple host systems together on the client device and wherein the initial aggregation foregoes the use of a centralized data store to aggregate the metric information from the multiple host systems prior to transmittal to the client device.

17. The computer-implemented method of claim 16, wherein the method comprises, prior to receiving the metric information from the plurality of host systems:
for the multiple individual host systems, receiving an indication of metrics that are available from that host system;
providing a user interface display comprising a selectable representation of at least some of the available metrics;
receiving a selection of one or more of the available metrics through the user interface display; and
for the multiple individual host systems, generating a request for one or more metrics in accordance with said selection; wherein said metric information is received in response to generating said request.

18. The computer-implemented method of claim 16, wherein the method comprises generating said graphical representation of the metric information such that the graphical representation comprises, for each of at least some of the host systems: a plot of at least one metric, wherein said plot comprises a graphical representation of the values of the at least one metric at different instances in time.

19. The computer-implemented method of claim 18, further comprising:
providing a graphical control for selecting a particular period of time, wherein the values upon which each plot is dependent comprise values measured during that particular period of time.

20. The computer-implemented method of claim 19, wherein the graphical control comprises a movable window of time superimposed on a timeline, wherein the graphical control is provided such that a length and a position of the window are configurable in order to specify said particular period of time.

21. The computer-implemented method of claim 18, wherein one or more of the plots are animated and change over time.

22. The computer-implemented method of claim 21, wherein the method comprises providing one or more controls configured to control movement of the animated plots.

23. The computer-implemented method of claim 16, wherein at least some of the host systems are members of a cloud computing environment.

24. The computer-implemented method of claim 23, wherein at least some host systems are members of different cloud computing environments.

25. The computer-implemented method of claim 16, wherein the one or more metrics include one or more of: processor metrics, memory metrics, network metrics, input-output metrics, disk metrics, or application metrics.

26. The computer-implemented method of claim 16, wherein the method comprises generating an aggregated metric based on individual metrics of multiple host systems of said plurality of host systems, wherein said graphical representation comprises a representation of said aggregated metric.

27. A computer-implemented method, comprising:
performing, on a host computer:
receiving from a client system a request for information specifying available metrics;
in response to the request for information specifying available metrics, providing to the client system a particular indication of available metrics of the host computer, wherein the metrics are measured by the host computer;
subsequent to providing the particular indication, receiving a request from the client system for one or more metrics from the particular indication; and
for the metrics specified in the request, providing metric information from a network interface of the host computer to the network interface of the same client device that sent the request for information specifying available metrics without intermediate storage of the metric information in a data store of metric data distinct from the host computer such that providing the metric information to the client device forgoes the use of a centralized data store distinct from the host computer to aggregate the metric information, the metric information specifying one or more values of that metric measured by the host computer at one or more instances in time.

28. The computer-implemented method of claim 27, wherein the method comprises providing one or more historical values of metrics, wherein said historical values are stored within a memory of the host system prior to receiving the request for information specifying available metrics.

29. The computer-implemented method of claim 27, wherein the method comprises providing one or more real time values of metrics, wherein said real time values are not stored within a memory of the host system prior to receiving the request for information specifying available metrics.

30. The computer-implemented method of claim 27, wherein the available metrics include one or more of: processor metrics, memory metrics, network metrics, input-output metrics, disk metrics, or application metrics.

31. A non-transitory computer-readable storage medium, storing program instructions computer-executable on a computer system to implement a performance monitoring component configured to:
for multiple individual host systems: receive metric information from a respective network-based interface of that host system in a decentralized manner; wherein for one or more metrics, the metric information indicates multiple values of that metric at different instances in time; wherein the one or more metrics are associated with performance of that host system; and
generate a user interface display on a client device comprising a graphical representation of the metric information from the plurality of host systems, wherein the metric information that is provided from the network-based interface of that host system is received at a network-based interface of the client device;

wherein receipt of the metric information from the multiple host systems is an initial aggregation of the metric information from the multiple host systems together on the client device and wherein the initial aggregation foregoes the use of a centralized data store to aggregate the metric information from the multiple host systems prior to transmittal to the client device.

32. The computer-readable storage medium of claim 31, wherein the performance monitoring component is configured to, prior to receiving the metric information from the plurality of host systems:

for the multiple individual host systems, receive an indication of metrics that are available from that host system;

provide a user interface display comprising a selectable representation of at least some of the available metrics;

receive a selection of one or more of the available metrics through the user interface display; and for the multiple individual host systems, generate a request for one or more metrics in accordance with said selection; wherein said metric information is received in response to generating said request.

33. The computer-readable storage medium of claim 31, wherein the performance monitoring component is configured to generate said graphical representation of the metric information such that the graphical representation comprises, for each of at least some of the host systems: a plot of at least one metric, wherein said plot comprises a graphical representation of the values of the at least one metric at different instances in time.

34. The computer-readable storage medium of claim 33, wherein the performance monitoring component is configured to:

provide a graphical control for selecting a particular period of time, wherein the values upon which each plot is dependent comprise values measured during that particular period of time.

35. The computer-readable storage medium of claim 34, wherein the graphical control comprises a movable window of time superimposed on a timeline, wherein the graphical control is provided such that a length and a position of the window are configurable in order to specify said particular period of time.

36. The computer-readable storage medium of claim 33, wherein one or more of the plots are animated and change over time.

37. The computer-readable storage medium of claim 36, wherein the performance monitoring component is configured to provide one or more controls configured to control movement of the animated plots.

38. The computer-readable storage medium of claim 31, wherein at least some of the host systems are members of a cloud computing environment.

39. The computer-readable storage medium of claim 38, wherein at least some host systems are members of different cloud computing environments.

40. The computer-readable storage medium of claim 31, wherein the one or more metrics include one or more of: processor metrics, memory metrics, network metrics, input-output metrics, disk metrics, or application metrics.

41. The computer-readable storage medium of claim 31, wherein the performance monitoring component is configured to generate an aggregated metric based on individual metrics of multiple host systems of said plurality of host systems, wherein said graphical representation comprises a representation of said aggregated metric.

42. A non-transitory computer-readable storage medium, storing program instructions computer-executable on a host computer to implement a performance reporting component on the host computer, the performance reporting component configured to:

receive from a client system a request for information specifying available metrics;

in response to the request for information specifying available metrics, provide to the client system a particular indication of available metrics of the host computer, wherein the metrics are measured on the host computer;

subsequent to providing the particular indication, receive a request from the client system for one or more metrics from the particular indication; and for each metric requested, provide metric information, wherein the metric information is provided from a network interface of the host computer to a network interface of the same client device that sent the request for information specifying available metrics without intermediate storage of the metric information in a data store of metric data distinct from the host computer such that providing the metric information to the client device forgoes the use of a centralized data store distinct from the host computer to aggregate the metric information, the metric information specifying one or more values of that metric measured on the host computer at one or more instances in time.

43. The computer-readable storage medium of claim 42, wherein the performance reporting component is configured to provide one or more historical values of metrics, wherein said historical values are stored within memory of the computer system prior to receiving the request for information specifying available metrics.

44. The computer-readable storage medium of claim 42, wherein the performance reporting component is configured to provide one or more real time values of metrics, wherein said real time values are not stored within memory of the computer system prior to receiving the request for information specifying available metrics.

45. The computer-readable storage medium of claim 42, wherein the available metrics include one or more of: processor metrics, memory metrics, network metrics, input-output metrics, disk metrics, or application metrics.

* * * * *